(12) United States Patent
Fortmann (10) Patent No.: US 11,721,540 B2
(45) Date of Patent: Aug. 8, 2023

(54) FLASHTUBE WITH SUBMICRON FUEL PARTICLES AND FUSABLE NUCLEOTIDE LIGHT-ABSORBING PARTICLES

(71) Applicant: ST. JOHN'S UNIVERSITY, Queens, NY (US)

(72) Inventor: Charles Michael Fortmann, Queens, NY (US)

(73) Assignee: ST. JOHN'S UNIVERSITY

( * ) Notice: Subject to any disclaimer, the term of this patent is extended or adjusted under 35 U.S.C. 154(b) by 159 days.

(21) Appl. No.: 17/271,084

(22) PCT Filed: Aug. 27, 2019

(86) PCT No.: PCT/US2019/048266
§ 371 (c)(1),
(2) Date: Feb. 24, 2021

(87) PCT Pub. No.: WO2020/046881
PCT Pub. Date: Mar. 5, 2020

(65) Prior Publication Data
US 2021/0335508 A1 Oct. 28, 2021

Related U.S. Application Data

(60) Provisional application No. 62/723,128, filed on Aug. 27, 2018.

(51) Int. Cl.
*H01K 1/62* (2006.01)
*H01K 1/04* (2006.01)
*G21B 3/00* (2006.01)

(52) U.S. Cl.
CPC ............... *H01K 1/625* (2013.01); *H01K 1/04* (2013.01); *G21B 3/008* (2013.01)

(58) Field of Classification Search
CPC . H01K 1/10; G21B 3/008; G21B 1/21; H05B 41/30
See application file for complete search history.

(56) References Cited

FOREIGN PATENT DOCUMENTS

CN 107342213 A 11/2017
EP 0016037 B1 * 4/1985
JP H0179300 * 5/1989

* cited by examiner

*Primary Examiner* — Joseph L Williams
(74) *Attorney, Agent, or Firm* — Venable LLP (57) ABSTRACT

A device and a method of heating nano- to micro-scale light absorbent particles within a flashtube designed to sequentially emit intense light, followed by an intense pressure wave. The flashtube device includes a housing and a central filament surrounded by the housing. An inner surface of the housing can be coated with light-scattering particles and/or light-absorbing particles. The filament is generally held in a superconducting state.

24 Claims, 4 Drawing Sheets

FLASHTUBE WITH SUBMICRON FUEL PARTICLES AND FUSABLE NUCLEOTIDE LIGHT-ABSORBING PARTICLES

This application claims priority of PCT Application No. PCT/US2019/48266 filed on Aug. 27, 2019 which claims benefit of earlier provisional U.S. application Ser. No. 62/723,138 filed on. Aug. 27, 2018.

BACKGROUND OF THE INVENTION

Field of the Invention

The present invention relates to a device and a method of heating nano- to micro-scale light absorbent particles within a flashtube designed to sequentially emit intense light, followed by an intense pressure wave.

SUMMARY OF THE INVENTION

It is an object of the present invention to provide a device and a method of heating nano- to micro-scale light absorbent particles within a flashtube designed to sequentially emit intense light, followed by an intense pressure wave. Therefore, the method of heating is a two-fold process. First, light is passively directed to heat specific particles through careful selection of the particle matrix, particle density, and spectral absorbance of the heated particle, relative to (a) the matrix and (b) the flashtube photoemission spectrum. Second, an intense pressure/shockwave that is generated by vaporization of the flashtube filament, further heats the preheated particles. The particles, which are pre-heated by photoabsorption, are thus, further heated by the pressure/shockwave. These pre-heated particles are heated to a far greater extent relative to the cool, surrounding matrix, due to well-known thermodynamic principles concerning pressure and temperature. Energy is provided at a high power through the decay of a superconductive filament, in series or in parallel with superconductive energy storage and pulse shaping elements.

According to one aspect, a flashtube device is provided that includes a housing that consists of a small volume, and a central filament surrounded by the housing. The housing includes an inner surface that is coated with a mixture of light-scattering particles and light-absorbing particles. The filament is held in a superconducting state, with the filament being connected to a power source that is composed of superconducting elements. The flashtube device is triggered by locally heating the filament to cause decay of the superconducting state. The filament may be designed to augment superconducting decay. For example the filament may be a hollow tube filled with a low temperature (e.g., less than room temperature) volatile solid or liquid such as carbon dioxide.

According to another aspect, a flashtube device is provided that comprises a superconducting filament, where the superconducting filament is triggered by heating to a temperature beyond a transition to resistive electrical conduction. The heating of the superconducting filament is provided by at least one of (i) an external separate circuit and (ii) radiant energy provided by an external laser.

According to another aspect, a flashtube device is provided that comprises an inner wall, at least one of (i) absorber particles and (ii) light scattering particles are dispensed on the inner wall, and a central filament that is spaced a short distance away from the inner wall.

According to yet another aspect, a flashtube device is provided that comprises absorber particles that comprise at least one easily fusable atom or isotope. The at least one easily fusable atom or isotope comprises at least one of Deuterium, Tritium, and Lithium.

According to another aspect, a flashtube device is provided that comprises an inner wall that contains light scattering particles. The light scattering particles comprise at least one of (i) $TiO_2$, (ii) diamond particles, (iii) frozen $D_2O$, (iv) frozen $H_2O$, and (v) frozen $CO_2$.

According to yet another aspect, a flashtube device is provided that has an initial pressure of less than 10 Torr.

According to a further aspect, a flashtube device is provide that is designed (a) to ignite at a low pressure and (b) to build pressure by gas heating that is augmented by evaporation of frozen materials disposed within the flashtube. According to this embodiment, the low pressure ranges from about a fraction of a Torr to several Torr. The frozen materials comprise at least one of frozen $CO_2$ and frozen $D_2O$. The flashtube device is initially at a temperature that is below the sublimation temperature of $CO_2$. The flashtube device is initially at a gas pressure of a fraction of a Torr to several Torr. The flashtube device builds pressure by discharge heating of working gas that is augmented by the evaporation of the frozen material disposed within the flashtube.

According to yet another aspect, a flashtube device is provided that comprises absorber particles. The flashtube device (a) builds absorber particle temperature to $\sim 10^6$ K by (i) direct absorption of flashtube radiant energy and (ii) pressure rise, and (b) maintains absorber particle temperature for greater than $10^{-9}$ s.

According to another aspect, a flashtube device is provided that comprises a housing and at least one of (i) X-ray scattering material and (ii) reflective media. According to one embodiment, the X-ray scattering material comprises aluminum particles embedded within a coating on an internal surface of the housing. According to another embodiment, the X-ray scattering material comprises aluminum reflectors positioned externally to the housing, wherein the aluminum reflectors return radiation to materials disposed within the housing.

According to yet another aspect, a method for directly heating a material for energy extraction is provided. The method includes providing a flashtube device, according to one of the embodiments discussed above. The material to be heated comprises a water bath.

According to yet another aspect, a flashtube, nuclear fusion reactor is provided that is designed to excite an atomic or molecule system to higher energy for generation of a directed particle to radiation beam.

According to another aspect, a multiplexed, flashtube thermonuclear reactor is provided that comprises at least a first flashtube and a second flashtube, with the first and second flashtubes each including a filament. Filament vaporization triggers the first flashtube, so that destruction of the first flashtube provides heat and pressure to trigger the second flashtube, to, thereby, generate large-scale detonations. The second flashtube is larger than the first flashtube. The second flashtube can also be concentric with the first flashtube.

Other aspects and advantages of the present invention will become apparent upon consideration of the following detailed description.

DETAILED DESCRIPTION OF THE INVENTION

Our invention generally relates to a device and a method of heating nano- to micro-scale light absorbent particles within a flashtube designed to sequentially emit intense light, followed by an intense pressure wave.

According to one embodiment of the present invention, the device for heating nano- to micro-scale light absorbent particles comprises a flashtube (or lamp). The flashtube may have a cylindrical design with a central axial conductive filament. The conductive filament may be comprised of a superconducting element (e.g., a superconducting filament, wire, or ribbon, and/or a superconducting coating on a resistive wire, rod, ribbon, tube, or surface) or a superconducting compound. The conductive filament may also be held at temperatures that are low enough to super conduct. A portion of the filament, when (i) comprised of superconductive material that is held cold enough to be in the superconductive state and (ii) supplied with an electrical current, may then be heated by an external trigger source (e.g., a laser beam from a pulsed laser) to revert a portion of the filament to a resistive conductive state.

Figure 1:
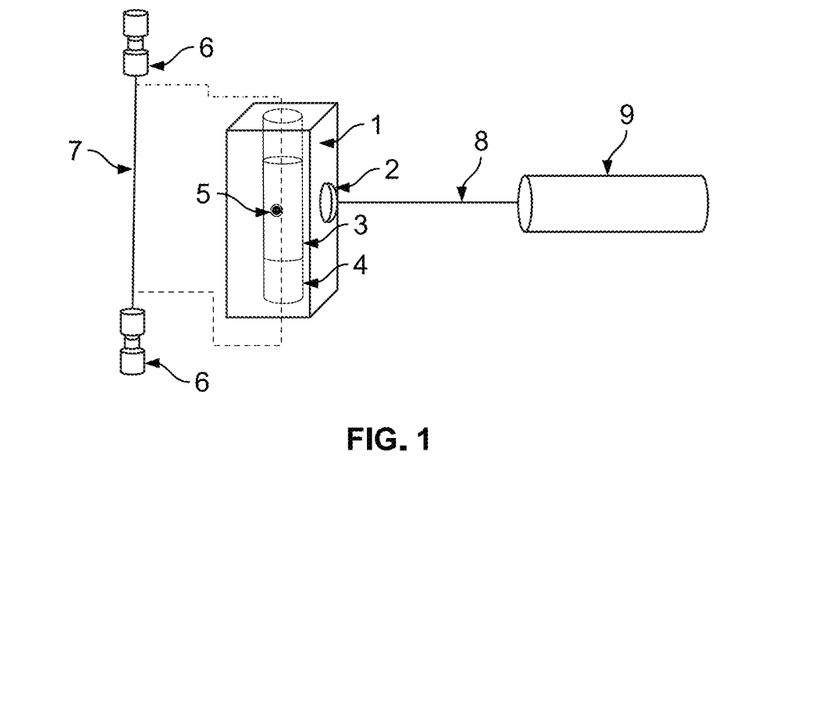
FIG. 1 illustrates a diagram of a flashtube according to an embodiment of the invention.

Turning now to the drawings, FIG. 1 illustrates a specially prepared flashtube (or lamp) according to an embodiment of the invention. The flashtube (or lamp) includes a robust, opaque housing (1), a window (2) for receiving a laser triggering pulse (e.g., a laser beam (8)), a flashtube bore (4), and a light scattering layer (3) deposited on an inner surface of the flashtube bore (4). Absorber particles (5) are dispersed within the light-scattering layer (3) deposited on the inner surface of the flashtube bore (4). A conductive filament (7) (or a superconducting wire or ribbon, and/or a superconducting coating on a resistive wire, rod, ribbon, tube, or surface) is disposed along a central axis of the flashtube or bore (4). Superconducting electrodes (6) are connected to the superconducting filament (7), which is induced to become resistive by a laser beam (8) (or other heating element) with wavelengths that are (i) absorbed by the filament (7) and the absorber particles (5), and (ii) produced by a pulsed laser (9) that is well known in the art.

In one embodiment of the invention, the superconducting filament (e.g., the superconducting filament (7)) may be coated with a material(s) to augment a vapor pressure build and/or to change the absorption spectrum of the filament, to better match a photo source that may trigger the superconducting state/decay, by heating the superconductive state of the filament. Such filament coatings for augmenting a vapor pressure build may be comprised of, for example, frozen carbon dioxide.

Figure 2:
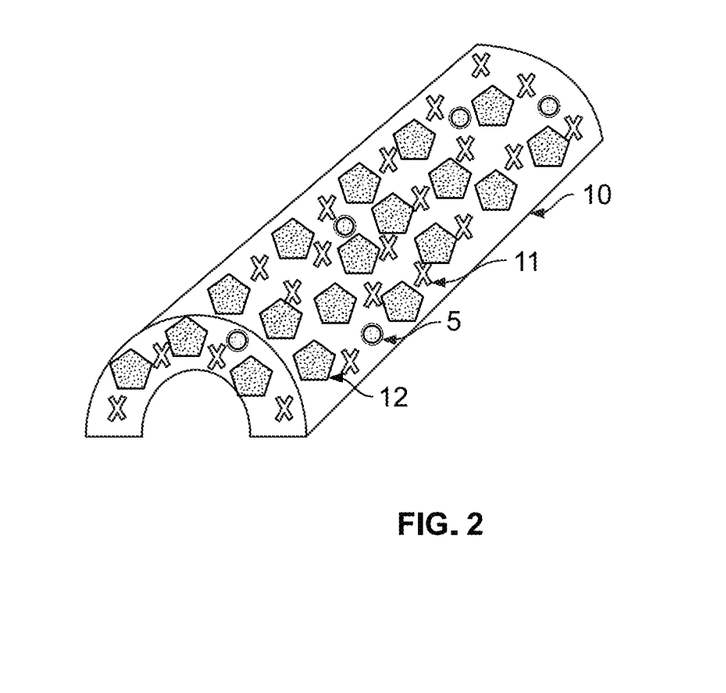
FIG. 2 illustrates a diagram of a coating of an absorber particle-light diffuser matrix applied to the interior of a flashtube according to an embodiment of the invention.

For example, FIG. 2 illustrates one embodiment of a coating of an absorber particle-light diffuser matrix applied to the interior of the flashtube volume (e.g., the light scattering layer (3) deposited on the inner surface of the flashtube bore (4)). The coating can be comprised of several materials designed to scatter visible light and/or infrared (IR) light, inhibit thermal conduction, and vaporize at a pre-determined temperature. For example, as shown in FIG. 2, the coating layer may be comprised of an absorber particle(s) (5) to be heated, an IR scattering particle (1), such as, for example, frozen carbon dioxide ($CO_2$), visible light scattering particles (12), such as, for example, titanium dioxide ($TiO_2$), and a transparent binding element (10), such as, for example, frozen deuterium oxide ($D_2O$).

As discussed above, a portion of the filament (e.g., the superconducting filament (7)) is preferably heated by an external trigger source (e.g., a laser beam from a pulsed laser) to revert a portion of the filament to a resistive conductive state. A suitable external trigger may be electrical or optical in nature. For example, an optical trigger may be comprised of (but not limited to) a high-speed laser entering the flashtube housing through a specially prepared window (see, e.g., the window (2) of FIG. 1). Alternatively, an electronic circuit may supply an electric current to a second resistive filament, which may be positioned nearby to the first superconducting element or filament (7), such that supplying an electric current will cause heating of the second filament, and, in-turn, the heated second filament will heat the first filament (e.g. the superconducting filament (7)), thereby triggering a decay of the superconductive state.

In one embodiment of the present invention, the central filament (e.g. the superconducting filament (7)) is surrounded by a chamber of a sufficiently small size, such that light generated by the filament transits the space to the chamber walls (e.g., where absorber particles are embedded in the light scattering layer or matrix) in a short period of time (for example, but not limited to, $<10^{-8}$ s). The chamber volume is made small enough, such that a fully vaporized filament (and any materials coating or incorporated into the filament) at or near its vaporization temperature, would provide a large vapor pressure (for example, but not limited to, 10,000 Torr) when confined to the small chamber volume.

In one embodiment, a superconducting tube may be used when a small volume is present either (i) inside the space of the superconducting tube or (ii) external to the superconducting tube, where the superconducting tube acts similarly to a superconducting wire. When the interior of the tube is a small volume, it can be filled with various light scattering materials, absorber particles, and/or pressure raising constituents that are similar to the case when a wire or a ribbon or other solid-type filament is used.

A pressure build may be markedly increased by both (i) limiting the vessel volume to the smallest volume possible and (ii) coating the filament, as discussed above, or other regions of the flashtube with a vaporizable component(s) or material(s) (e.g., but not limited to, solid carbon dioxide, ice, and/or frozen deuterium oxide and/or any combination of these or other components). Such a coating, which is intended to raise the pressure, may also be engineered to aid in heat retention when heating absorber particles by scattering long wavelength radiation. In addition, with respect to the limiting of the vessel volume, in tube-type filaments, the volume may be that of the inside of the filament tube.

Flashtube filaments may be connected to (e.g., powered by) other superconducting and non-superconducting circuit elements that store energy. The energy storing circuit elements may include a superconducting inductor(s) and/or a superconducting capacitor(s) scaled to store sufficient energy to heat the absorber particles to the desired temperature. In one embodiment, extra energy may be needed to cover various heat loss paths, which will be described in further detail below. In one preferred embodiment, the superconducting filament is connected to a superconducting inductor by a superconducting wire. In another embodiment, a current can be induced to flow in a superconducting circuit or loop using commercially available superconducting magnet power supplies. For example, the flashtube filament may be substituted for the generally used superconducting link that is made resistive to start current flow in the circuit or the flashtube filament may be placed in series (or in parallel) with a resistive current starter link.

Generally, an initial emission of heating occurs with the filament (e.g., because resistance of the filament will increase from zero to a finite value due to an initial heat impulse from, for example, the laser (9), as shown in FIG. 1). Thereafter, heating of the filament generally progresses from the infrared (IR) spectrum, towards the visible spectrum, and finally proceeding into the ultraviolet (UV) spectrum, until the filament melts and/or vaporizes (depending on the driving current). The correlation of the emission spectrum to heating is fully-described by the well-known physics of blackbody radiation that is dependent on temperature.

For example, in one embodiment, absorber particles are selectively heated by absorbing a significant portion of the filament's blackbody radiation in the initial stages of heating, when the filament's photoemission is predominately in the visible spectrum (and/or near the IR spectrum, depending on the absorption spectrum of the chosen particles), while the surrounding matrix, which is chosen for its transparency (in this spectrum), remains relatively cool (e.g., temperature wise). Accordingly, the absorber particles will become hotter than the surrounding matrix. For example, the particles may be visible light absorbent molecules, crystal particles, solid, liquid, or gas. Absorber particles of particular interest, due to their ease of preparation, are chlorophyll and/or algae and their deuterated analogs. In one embodiment, the matrix may be comprised of compacted titanium oxides crystal grains, since these compounds will refract and/or scatter light, while not absorbing near-IR and/or visible light. Glass, diamond, and other scattering materials may also be chosen for the matrix material(s). In addition, mixtures of different refraction index, non-visible (and/or near-IR) absorbing particles can be used, which scatter light, and thereby, light scatters about until absorbed by the absorber particles (and/or in defects in the transparent matrix).

Figure 3:
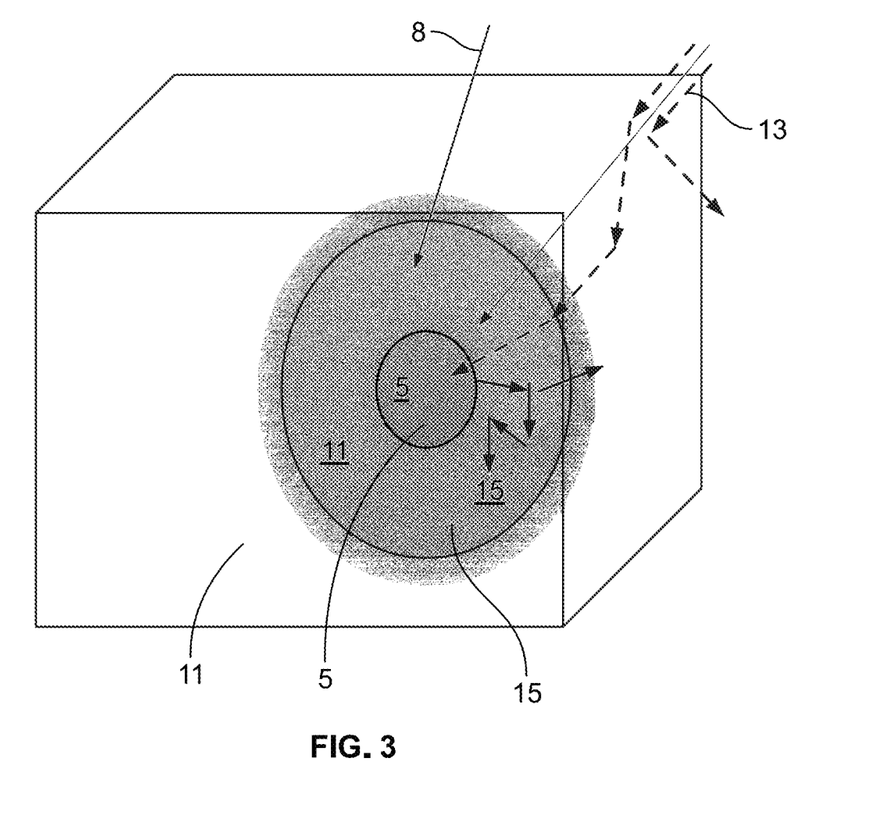
FIG. 3 illustrates a schematic of diffusive heating of an absorber particle according to an embodiment of the invention.

FIG. 3 illustrates one embodiment of a diffusive heating scheme of an absorber particle (5) onto which several of the materials, as described above with respect to FIG. 2, have been directly applied to the exemplary absorber particle (5). In this embodiment, the absorber particle (5) is pre-heated by an intense light beam (8) that heats the superconducting filament (7) until the filament (7) becomes resistive. Since the heated filament (7) may be connected to current sources and/or inductive elements, as the current flows, the filament (7) is heated. The heated filament (7) becomes hot and radiates heat, according to the well-known principles of blackbody radiation, as discussed above, and, thus, radiating heat or light (13) also contributes to heating of the absorber particles. In this example, the coating (15) applied to the absorber particle (5) is selected to strongly scatter IR, near IR, and other long wavelength radiation. As the absorber particle (5) heats, it also radiates energy according to the well-known principles of blackbody radiation. Initially, as an absorber particle heats, it radiates predominately long wavelength radiation. This wavelength scatters within the IR scattering coating (for example, frozen $CO_2$) applied to the absorber particle (5), which causes this light to either get absorbed within the coating (15) or escape the absorber particle (5), where it may get absorbed by another absorber particle (14).

According to one embodiment of the present invention, matrix composition is designed to play an important role in slowing heat flow from (i) the heating of the absorber particles and (ii) the heated absorber particles. Fine grain aggregates of crystalline materials, including, for example, $TiO_2$, both aid light scattering and inhibit heat flow by using designs that reduce intimate contact among the aggregate grains, where electron flow (i.e., a heat transport mechanism) and phonon flow (i.e., a heat transport mechanism) is reduced. In addition, heat transport reduction can be attained with materials of differing grain sizes (e.g., when grains are small enough, phonon spectrum can become truncated). (See, for example, C. M. Fortmann, *Physical Review Letters* 1998.) Also, aggregates of differing refractive index and/or differing band gaps may further inhibit electron flow (i.e., differing band gap cases), and grain misalignment can inhibit heat flow by reducing phonon and, in some material cases, electron flow, due to quantum momentum selection rules. Such aggregate mixtures further enhance light scattering by refractive index mismatch between the various particle types and between the particles and the spaces between them.

It is further noted that refractive index is a wavelength dependent phenomena. Therefore, the light scattering of an aggregate of differing refractive index materials will exhibit a spectral dependence. Furthermore, some bulk and molecular species may have a particular wavelength in which light scattering is strong. For example, one such material is molecular $CO_2$ in which strong scattering of long wavelength light is observed. Therefore, in one embodiment, inclusion of frozen $CO_2$ in the aggregate may be used to decrease the scattering length of long wavelength light, thereby, slowing radiant heat flow.

According to one embodiment, the energy that is needed to heat a small collection (for example, but not limited to, from 1 to 1000) of small size-scaled (for example, but not limited to, $10^{-12}$ cm$^3$) particles to extremely high temperatures is relatively small. For example, the heating of one hundred of the above-discussed, small-sized particles to $10^8$K from room temperature requires ~$10^{-2}$ cal (assuming a specific heat of 1 and a mass density similar to water). However, when nuclear fusion is the goal and therefore, the well-known Lawson Criteria is to be met, the heating must be accomplished in less than $10^{-8}$ s. In-turn, the supplying of energy on this time-scale requires extremely high power levels, e.g., in excess of $10^6$ Watts.

However, according to one embodiment of the present invention, the power or energy needed can be divided into two parts: the first is the aforementioned light and the second is a pressure pulse. The rapid heating and overheating to vaporization of a thin filament provides for both light and pressure pulses. The intensity of the pressure pulse is a strong function of the confinement. For example, the smaller the volume in which the vaporized filament is contained, the greater the pressure rise. It is also important to recognize that, by applying well-known gas laws, relatively hot particles will generally absorb more pressure wave energy and heat proportionally greater (e.g., with respect to a ratio of initial temperature), compared to relatively cool matrix materials.

Furthermore, it is generally impossible, using conventional circuits, to provide the power levels necessary to cause heating in a desired time period, where energy loss occurs through radiation and material dispersement. Capacitors, batteries, and inductors of modest size can easily store the necessary energy. However, conventional circuit elements have internal resistance and thus, when connected with conventional wires and circuits, these circuit elements add resistance to the overall circuit. Moreover, well-known circuit theory teaches that energy flow (i.e., power) decreases with increasing circuit resistance.

Thus, the heating of even small particles to $10^7$K requires extremely high power levels, as discussed above. Such power levels, however, cannot be achieved with resistive circuits. By contrast, required power levels may be achieved using superconductor circuit elements, which have a resistance of zero.

The decay of the superconducting state of a fine, superconducting filament in series with a superconducting inductor provides intense power levels. In-turn, the induced current from the superconducting inductor responding to the current change produces voltage and current, in accordance with well-known circuit theory concerning inductance. The net power delivered by the decaying superconductivity in a superconductive link in a superconducting loop is a function of the energy stored. In this regard, when a superconductive inductor is in series with a superconductive decaying link, the net power relates to the difference between (i) the initial energy stored in the inductor and (ii) the energy stored in the inductor at the point where the current reaches the critical value, which is the point when the inductor reverts to conventional conduction and dissipates its energy through internal resistance (i.e., heating).

The flow of the induced current through the filament causes further temperature rise. When energy storage is sufficiently large (see, e.g., commercially available large superconductive inductors) (note also, that energy storage may also employ capacitors), the filament will heat to vaporization and current may continue to flow through the hot conductive gases and/or plasma. The vaporization of the filament occurs, sequentially, as light from the heated filament, followed by a vaporization induced shockwave that is comprised of the heated constituents of the vaporized filament.

As discussed above, the superconducting element may be powered with a superconducting inductor placed in series or in parallel with a superconducting filament. Emitted, unfocused light is diffusively collected by small particles embedded in a light scattering coating that can be applied internally to the flashtube (see, e.g., embodiment of FIGS. 1 and 2). Light absorption by these light-absorbing particles results in these absorber particle having a higher temperature relative to a non-light absorbing, light-scattering matrix material.

In some embodiments, the light absorbing matrix and embedded particles are applied as a coating to an internal wall of the vessel (e.g., flashtube). In other embodiments, the light-scattering matrix and the light absorbing particles may be applied to the filament itself. While, in still other embodiments, the filament may be hollow and the light absorbing material may be dispersed in a hollow region(s) (e.g., in this case, the filament may be both the vessel and the filament).

In one embodiment, the distance between the filament and the vessel wall will determine the time difference between light arrival (which is also a function of scattering) and shockwave arrival. By design, the filament-vaporization, generated shock/pressure rise and/or waves arrive after the photo-pre-heating of absorbent particles. The internal flashtube vessel (or housing) is designed to have minimal volume to thus, enhance pressure rise and to amplify, through resonance, pressure pulses and/or waves. Well-known gas law(s) and, to an even greater extent, Van der Waals (a more recent refinement of gas law), predict that a pressure increase/induced temperature rise is a function of the initial temperature of the pressurized particle. In this regard, consistent with a superconducting filament, the initial temperature of the flashtube is low (e.g., liquid helium temperature) and therefore, the vapor pressure within the flashtube vessel is also low (e.g., less than $10^{-5}$ torr). The ratio of the initial pressure to the final (i.e., peak) pressure is an essential consideration with respect to a particle temperature increase.

Furthermore, well-known gas laws predict that (a) particle temperature and (b) energy absorbed by the particle, both increase with increasing initial particle temperature. Therefore, the light absorbing particles, which are heated to a higher temperature relative to the light-scattering matrix, will, thereby, absorb a greater percentage of any shock/pressure wave energy. Specifically, the ideal gas law can be arranged as follows:

$$T_2 = \frac{P_2}{P_1}T_1 \text{ and thermal energy increase} = \left(\frac{P_2}{P_1} - 1\right)\delta T_1 \quad (1)$$

where $T_1$ and $T_2$ are the particle temperature before and after, respectively, a pressure pulse raises the pressure from $P_1$ to $P_2$, and $\delta$ is the specific heat of the specific particle being considered. Thus, Equation 1 clearly shows that the final temperature rise is proportional to the ratio of final-to-initial pressures. Importantly, the pressure (and/or shock) wave energy absorbed by a given particle is seen to increase with increasing initial temperature (it is further noted that, while the ideal gas law does not provide precise description of the pressure rise for non-ideal gas confined to small sample volumes, Van der Waals and other subsequent revisions of the gas law lead to higher $T_2$ predictions.)

In one embodiment, a substantially transparent, light-scattering media enables light incident over a large area to be absorbed by a relatively few, small-sized absorbent particles. Thus, in one preferred embodiment, transparent scattering materials and absorbent particles are deposited as a lining on the interior surfaces of a flashtube and/or housing. In this preferred embodiment, the housing is generally maintained at a temperature below the sublimation temperature of carbon dioxide ($CO_2$).

In general, the filament spectrum evolves with both peak photon energy and total radiant power increasing with filament temperature. In one embodiment of the present invention, filament temperature increases with time. Thus, the emitted photon peak energy and the radiant power will also increase with time. Therefore, it is generally important to ramp up the filament temperature as quickly as possible, in order for filament emission to quickly radiate the most energy in the visible spectrum, where the absorbance differential between scattering type particles and absorber particles is the greatest.

In general, maximum light energy emitted is a function of the vaporization temperature of a filament. Accordingly, the emitted energy can be defined by the following well-known blackbody radiation formula:

$$\text{Emitted Energy} = \sigma T^4 \quad (2)$$

where σ is a constant and T is filament temperature (for this example). Equation (2) shows that high vaporization/melting temperature filament will radiate a large amount of energy. In addition, further study of blackbody radiation shows that the spectrum will shift to visible light/UV. In some cases, it may be necessary to use UV scattering, non-UV absorber matrix materials, such as, for example, diamond, in order to achieve sufficient heating of the absorber particles, while avoiding heating of the light scattering matrix.

In one preferred embodiment, a superconducting filament transitions to normal conduction (e.g., due to external heating by an external light (or laser) and/or an electrical source). By transitioning to normal conduction, the superconducting element (or filament) may be part of a circuit containing a magnetic solenoid inductor. This solenoid may itself be comprised of a superconducting winding. In this regard, such superconducting circuits may be capable of delivering powers greater than $10^9$ Watts. In addition, the entire circuit may contain superconducting wires, loops, inductors, and capacitors, as well as normal conductance elements.

In one embodiment, where a filament driving circuit is used, a suitable inductor may be comprised of a readily available, commercial superconducting magnet and a commercially available starting circuit. Such commercially available superconducting magnets are capable of storing energy of greater than 10,000 J ($E=1/2$ L $I^2$), when fully energized by a flowing current. In this equation, E is the stored energy, L is the solenoid inductance, and 1 is the current flowing through the solenoid. By positioning the superconducting filament in the self-sustaining current loop of a superconducting magnet, no energy will be delivered to the filament while it is in its superconducting state. Upon heating of the filament above its critical temperature, the filament then becomes resistive.

Upon the flashtube filament becoming resistive, while the filament is in a superconducting current loop containing a flowing current and a superconductive magnet, energy will be dissipated within the now, non-superconducting (and therefore, resistive) flashtube filament. Energy will only be dissipated in the filament until the induced current flow in the magnet (i.e., inductor) exceeds the critical current of its superconducting windings. At this critical current, the energy stored within the magnetic field will begin to be dissipated by the magnet as heat. Nonetheless, by this time, a substantial amount of energy will have transferred to the filament. In this regard, the total amount of energy deposited into the filament can be defined as follows:

$$E_{total} = \frac{1}{2}L(I_c^2 - I_{initial}^2) \quad (3)$$

where L is the inductance of the magnet, $I_c$ is the critical current of the superconducting magnet windings, and $I_{initial}$ the initial current flowing through the superconductor.

At an initial temperature, which is sufficiently low to support a superconducting state in readily available superconductor materials (e.g., a liquid helium temperature), heating the superconducting filament a few degrees K is sufficient to cause the filament to become resistive. Thereafter, the resistive filament will completely vaporize when connected to a sufficiently large magnet with a sufficiently large current flowing therein. The vaporized filament will then cause the pressure to rise in the confined flashtube vessel. In addition, materials previously deposited onto the filament or positioned within the flashtube vessel may also vaporize, which will further contribute to the pressure rise.

For example, frozen $CO_2$ deposited onto the filament and/or the flashtube vessel will quickly vaporize with increasing temperature. Frozen $H_2O$ or $H_2O$ may also be used and/or substituted for $CO_2$. Positioning these materials close to or on the filament allows these materials to vaporize at an early time, when the filament is at a low (e.g., little light emitting) temperature. Therefore, these vaporizing components start a pressure rise before the filament reaches a temperature sufficient to radiant significant light energy.

By positioning these easily vaporized materials near to or on the flashtube vessel wall, these materials will not vaporize until the filament emission (i.e., temperature) in the spectral absorption range of these particles is reached. In the case of $CO_2$, for example, the near-IR spectrum will be necessary for both absorption and subsequent heating. Nonetheless, the pressure rise will take time to reach absorber particles positioned on the flashtube vessel wall. By sizing the flashtube vessel appropriately, these easily vaporized species/materials will be overtaken by the constituents of the vaporizing filament before reaching the flashtube vessel wall. In this regard, the speed that vaporized filament components will travel is a speed that can be determined by the following vaporization temperature $T_V$:

$$\text{velocity} = \sqrt{\frac{3k_B T_v}{m}} \quad (4)$$

where $k_B$ is the Boltzmann constant and m is the mass of the specific component. Therefore, one can expect that a filament vaporizing at 2200K will produce a speed of approximately 1066 m/s, meaning that, for example, Titanium atoms will travel a distance of ~11 microns in $10^{-8}$ s. (It is noted that, in one preferred embodiment, titanium is a likely component of the filament.)

In view of the foregoing, for optimal heat and pressure pulse arrival timing, the filament-to-vessel inner wall distance should generally be small, e.g., on the order of a millimeter or less. However, larger distances would be possible in cases where the filament heats quickly enough to superheat beyond its nominal vaporization temperature, thereby, generating higher temperatures, which would allow for high speed vapor components to cover greater distance in a given time period.

The engineering of vessels and filaments to this size scale is easily within the capacity of current machining practice using, for example, machinable ceramics for the vessel. It is noted, however, that the vessel needs be sufficiently insulated to prevent current flow diverting from the filament to the vessel (i.e., when the filament becomes resistive).

In addition, inhibiting heat outflow from radiation, preheating absorber particles enables greater latitude with the pressure/shockwave arrival timing. Since the key goal is to have the absorber particle much hotter than surrounding light-scattering materials at the instant the pressure wave arrives. For example, tuning a light-scattering matrix to deliver the intense high energy (i.e., visible/UV) light of a heated and vaporizing filament, requires long scattering lengths. (See, for example, Showmon, Glicksmann, and/or any other text describing the relationship between diffusion scattering length and diffusion length as a function of time.) Conversely, keeping heat within the absorber particle(s) will result in shorter diffusion lengths for longer wavelength lights emitted by heating and/or hot absorber particles, which are not yet as hot as the vaporizing filament. For example, in one embodiment, this shorter diffusion length for IR can be achieved through the incorporation of long wavelength selective scattering media, such as, for example, $CO_2$ (i.e., frozen particles). This is a constructive use of the so-called Greenhouse effect. In this embodiment, the visible light heats the absorber particles, while shorter diffusion length IR and near-IR radiation emitted from the heated absorber particles moves at a much slower speed, thereby, aiding heating.

In one embodiment of the present invention, slowing outflow of heat and slowing heating, aids in vessel design. For example, slower heating and slower heat outflow enables larger filament-to-vessel wall distances. In this regard, the filament-to-vessel wall distance affects the timing of the pressure/shockwave pulse arrival at the absorber particle(s). Alternatively, heat outflow can be increased by absorber particle choice. For example, absorber particles that absorb radiant energy by promoting electrons to excited levels, later release the energy as heat when the excited electrons decay (or return) to their initial and/or ground state. In one embodiment, radiation losses can be mitigated by temporarily storing absorber particles' radiant energy in the electronic excited state. Accordingly, the time needed for the slower (i.e., than light) pressure waves to transit the filament-to-vessel wall space can be provided. In general, it is important to recognize that the relative temperature between the absorber particle and the surrounding matter should be as high as possible for efficient, selective heating of the absorber particle, as discussed above.

In one embodiment, the pressure rise, which is fueled by the intentional vaporization of the filament and filament components, such as, for example, the above-discussed $CO_2$ frozen particles, will ultimately account for the final 99.9% of energy needed to heat absorber particles to their final temperature. Both the absorber particles and the matric components may eventually dissociate and/or vaporize. Nonetheless, the resultant pressure/shockwave will generally induce the hottest particles (e.g., the absorber particles) to heat to the highest temperature and thereby, absorb the greatest quantity of energy.

According to one embodiment of the present invention, pure frozen hydrogen or deuterium does not have the requisite visible light absorption to serve as an absorber particle. Therefore, algae and/or algae chlorophylls are suitable for absorber molecules. (It is further noted that algae and/or algae chlorophylls can easily be deuteriated using known culturing procedures, such as those demonstrated at St. John's and elsewhere.) However, water and deuterium oxide (in particular) provide suitable IR and near-IR light absorbing matrix components when used in combination with $CO_2$, which further provides a means for engineering a scattering length differential between IR (and near-IR) and visible light radiation.

Figure 7:
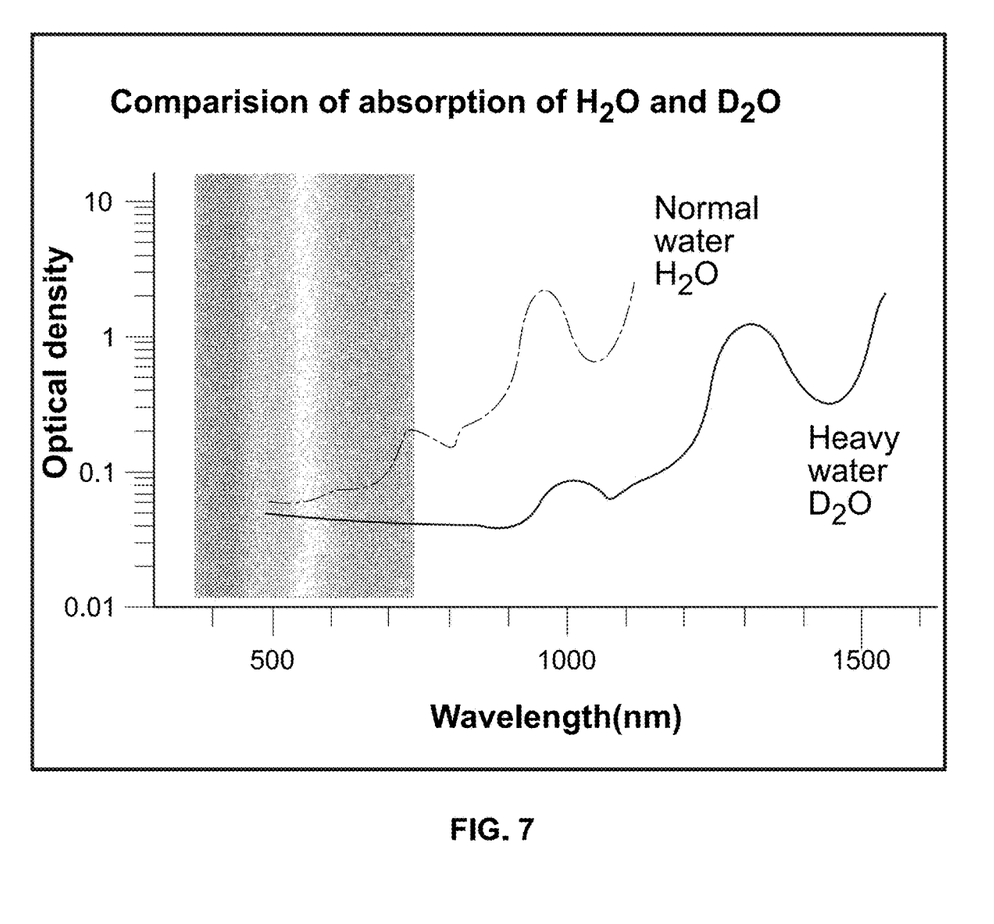
FIG. 7 illustrates a graph that compares the photo absorption spectra of water and deuterium oxide (i.e., heavy water).

Thus, according to one embodiment of the present invention, chlorophyll(s) and algae provide for two suitable types of absorber particles. In this regard, a plant and its chlorophyll contain large amounts of hydrogen or deuterium, in the deuterated cases, e.g., both greater than 30%, and can be easily prepared as deuterium variants. Furthermore, these absorber particles contain relatively light elements (e.g., C) that produce a more favorable x-ray emission spectrum. For example, as shown in FIG. 7, the photo-absorption spectra of water and deuterium oxide (i.e., heavy water) is compared. As shown in this embodiment, for example, heavy water exhibits significantly less absorption in the regions of ~650 to ~710 nm where neon line emission is strong and chlorophyll-based is absorption is strong.

In one embodiment of the present invention, the invented flashtube design has the engineered potential to diffusively heat absorber particles by filament radiation collection and pressure/shockwave pulse to temperatures in excess of 1,000,000 K. Diffusive light collection permits small absorber particles to efficiently collect light, without focusing of the light. In addition, the initial radiation absorption must raise absorber particle temperature to a target temperature of ~ 1300K. Thus, the optimal spacing between absorber particles for full absorption of the available visible light radiation, radiated from the filament, is important. In this regard, the spacing between absorber particles (e.g., within the light-scatter matrix) must be large enough so that particles do not compete with one another for available energy, since this leads to less heated particles. On the other hand, spacing beyond the diffusion length of the UV/visible radiation spectrum can leads to wasted energy.

According to one embodiment, light diffusion in a substantially transparent media (e.g., comprised of $TiO_2$ and/or diamond crystalline and/or frozen $D_2O$, $H_2O$, and/or $CO_2$ particles) conveys visible light to embedded absorber particles. As in any diffusing phenomena, a diffusion coefficient can be formulated as follows:

$$D = \frac{1}{6}\Gamma(l_0)^2 \xrightarrow{light} \frac{1}{6}\frac{c}{Nl_0}(l_0)^2 = 1/6\frac{cl_0}{N} \qquad (5)$$

where $\Gamma$ is the scattering rate, c is the speed of light in a vacuum, and N is the refractive index of the media. The distance from which light can be reasonably collected is related to the absorption coefficient of the media ($\alpha_m$), where an incident radiation would result in a loss of 1/e of its photons in a distance of $1/\alpha_m$, and/or since light travels at speed c/N in media. Therefore, the diffusion time is $N/(c\alpha_m)$ and the approximate RMS diffusion distance, $l_{rms}$ is the following:

$$L_{rms} \approx \sqrt{Dt} = \sqrt{\frac{1}{6}\frac{cl_0 N}{N c\alpha_m}} = \sqrt{\frac{1}{6}\frac{l_0}{\alpha_m}} \qquad (6)$$

Figure 4:
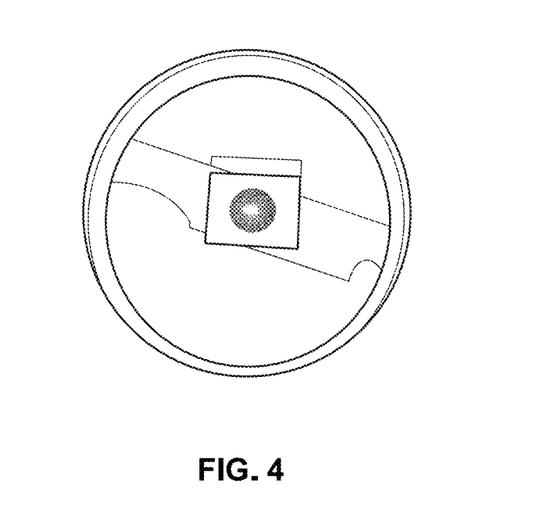
FIG. 4 is a photograph of diffuse reflection of a laser pointer in a light scattering diamond film according to an embodiment of the invention.

According to one embodiment of the present invention, the resultant lateral diffusion of light in an appropriately prepared non-absorbing media can be dramatic. For example, FIG. 4 is a photograph of the diffuse reflection of a laser pointer in a light scattering diamond film, where the film is a ~1 µm thick $TiO_2$-based film. FIG. 4 further shows an ~1-2 mm laser pointer beam diffusing to a distance of ~1 cm in a layer prepared by the Fortmann Laboratory.

Thus, according to one embodiment of the present invention, the optimal length can be found through rudimentary experiment by measurement of the absorption of various films as a function of absorber particle spacing (and/or concentration). Further refinement may be made to the absorber particle spacing by using finite elements photonic-engineered layers and scattering particles.

In general, scattering IR and near-IR radiation at shorter distances than that of visible light (i.e., the heating radiation described above) serves two purposes. First, reducing the wavelength's scattering length proportionally reduces the corresponding diffusion coefficient (D), as described above in Equation 1. In-turn, reducing D reduces the net energy outflow per unit time, thereby, increasing particle heating (e.g., which is analogous to the Greenhouse Effect). Secondly, by scattering and/or absorbing the IR and near-IR radiation in a distinct particle designed to vaporize under IR/near-IR irradiation, the long wavelength(s) radiating from hot and/or heating absorber particles is not only slowed by $CO_2$ scattering, but additionally, radiant energy absorbed by $CO_2$ contributes to $CO_2$ vaporization. Thereby, the escaping radiant energy contributes to the pressure build, which in-turn, delivers energy back to the absorber particle through the pressure/shockwave pulse.

Thus, according to one embodiment, design considerations relate to the flashtube inner coating having differential visible, IR, and near-IR scattering lengths. In this regard, such layers can be easily prepared. For example, visible light scattering particles (e.g., $TiO_2$, $Al_2O_3$, and/or diamond in frozen water (deuterium oxide)) can provide a host for the absorber particles with a suitable density of near-IR and IR scatters (e.g., solid $CO_2$) to limit the IR (and near-IR) diffusion distance (e.g., achieved, for example, in $\leq 5 \times 10^{-7}$ s) to less than the spacing between adjacent absorber particles.

In general, electronic excitation absorption effectively stores energy until excited state decay. According to one embodiment, chlorophyll molecules and algae exhibit absorption bands that match closely to visible spectral line emission. Furthermore, the Fortmann Laboratory has learned to cost effectively prepare these materials both in a deuteriated form. Thus, in one embodiment of the present invention, chlorophyll molecules and/or algae, preferably, in a deuteriated form, can be used as absorber particles. However, absorber particles are not limited to chlorophylls and/or algae, as almost any hydrogenated molecule can be synthesized as a deuterated species.

As described above, engineered, light-scattering photonic solid matrix materials can significantly reduce radiated heat lost. According to one embodiment, non-radiated thermal conductance, where heat is conducted by atomic motion, phonons, and/or charged carriers, must be controlled. However, contrary to intuition, FIG. 5 demonstrates, for example, that well-engineered insulators, such as those used for Space Shuttle tiles, are able to inhibit heat flow to a remarkable degree. For example, in this embodiment, Figure S, which is a photo of a NASA Space Shuttle insulating tile, demonstrates how sufficiently small thermal conductivity and thermal mass allows for a 2200° F. specimen to be picked up by an unprotected hand.

The Fortmann Laboratory has identified key elements of limited heat conductance, which include small grained ($\leq 1$ µm) crystalline, intrinsic, and/or large band materials. Thus, according to one embodiment, good candidate materials for the flashtube design include the aforementioned $TiO_2$ or Diamond particles (along with IR scattering and absorbing $CO_2$ particles) in a $D_2O$ ice matrix. The advantage of $D_2O$ ice over $H_2O$ is reduced IR absorption (see, e.g., FIG. 7). These materials are commercially available heat shield materials that have poor electronic conduction (e.g., when sufficiently cool and not at melting temperature) due to their large band gaps. For example, a solid comprised of an aggregate of misaligned small crystal grains frustrates phonon-based heat-transport. This is because (i) phonons must necessarily scatter at the misaligned grain boundaries and (ii) long wavelength phonons needed for momentum conservation upon scattering do not exist in sufficiently small grains. Furthermore, mixtures of two or more types of crystalline materials (e.g., mixtures of $TiO_2$ and Diamond particles) contribute mismatched electronic bands and mismatched photon spectrums that further inhibit thermal flow.

In accordance with another embodiment of the present invention, X-ray emission energy loss may be mitigated by the incorporation of additional X-ray scattering media to the light-scattering material that is internal to the flashtube (or lamp) and/or external to the flashtube (or lamp). Such external structures and/or media could include reflectors (e.g., fashioned from aluminum), as well as strong, light scattering particles embedded within the internal light-scattering media, such as, but not limited to, aluminum particles.

According to another embodiment, a rise in pressure is essential to the attainment of an ultra-high temperature. Thus, according to one embodiment, the heating of the flashtube (or lamp), which accordingly heats its working gas (e.g., neon), is augmented by an engineered cryogenic coating (e.g., $CO_2$ layers or particles), as described above, to generate an intense pressure pulse, when the flashtube is illuminated with IR and near-IR illumination. This pressure pulse, which is generated by the heating of small particles, can be described in terms of the induced volume, as well as the significant volume fraction occupied by atoms. (See, e.g., Van der Waals considerations, which are a starting point, but pressure-induced temperature rise in small particles requires a more detailed model.)

Figure 6:
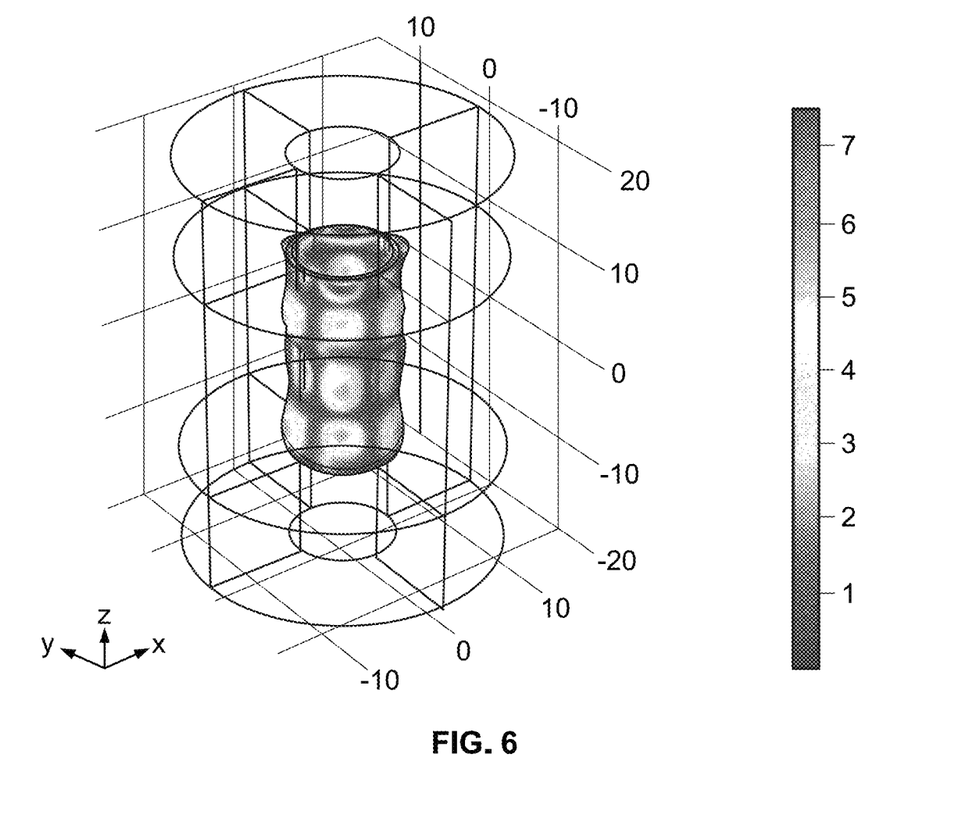
FIG. 6 illustrates a finite elements computer simulation of pressure wave resonance in a tube.

Furthermore, according to another embodiment, pressure wave resonance that occurs within the flashtube vessel may be used to extend the time range over which heated absorber particles and pressure/shockwaves interact. In particular, using commercially available finite elements software (see, e.g., FIG. 6), it is shown that, like most confined spaces subject to time-dependent pressure variation, a wave will be reflected and confined until the energy is dissipated. For example, as shown in FIG. 6, a finite elements computer simulation illustrates the above-discussed pressure wave resonance in a tube, such as a flashtube according to one embodiment of the invention (note, however, that dimensions and frequency are not to scale). Moreover, such pressure wave confinement may also contribute to a self-sustained heating of absorber particles.

According to another embodiment, if (i) a provided, heated absorber particle achieves Lawson criteria and, thereby, vaporizes due to nuclear fusion (e.g., a deuterated or other easily fused element or isotope containing the absorber particle vaporizes) and/or (ii) the absorber particle simply vaporizes by heating, the vaporization pressure adds, in-phase, to the pre-existing pressure wave. Accordingly, the building or adding to the pressure wave leads to an increased probability that a subsequent absorber particle will be exposed to a larger pressure wave, which, thus, leads to another fusion/vaporization of absorber particles.

However, according to another embodiment, since the absorption spectrum of $H_2O$ and $D_2O$ is relatively low in the visible light spectrum (see, e.g., http://www.webexhibits.org/causeofcolor/58.html), these materials may be either added to light-scattering, absorber particle layers on the vessel wall or coated onto the filament, to assist in the above-described pressure build and to capture IR and near-IR radiation. In addition, by capturing IR and near-IR radiation, these added materials can convert this potentially lost energy into pressure.

In accordance with another embodiment, precise tuning of (i) the absorber particle density and (ii) the composition of the easily vaporized components, achieves optimization of the synchronized radiant heating and pressure wave arrival. For example, the aforementioned electronic control, radiant (i.e., visible light) in-diffusion control, out-radiation diffusion control (e.g., a separate diffusion length variable), and passive elements, including, for example, the utilization of $D_2O$ (and/or $D_2O$—$H_2O$ ice mixtures) to control matrix heating, vaporization, and pressure wave contribution, as well as $CO_2$ particle size and spacing, can assist in achieving optimized pressure wave synchronization and/or radiation out-diffusion scattering length.

According to another embodiment, the Lawson criteria relates to clear, confinement at near solid density ($\sim 10^{22}$ $cm^{-3}$), which requires confinement time in the range of $\sim 10^{-8}$ s. However, maintaining confinement this long is a central challenge for all fusion energy strategies, whether large or small. The problem is that at $10^7 K$, deuterium atoms (ions) have a thermal velocity of $\sim 2 \times 10^7$ cm/s. Accordingly, a condensed matter matrix, again, has an advantage. In this regard, as thermal atoms and ions leave absorber particle(s), they impact atoms of the matrix, including relatively heavy matrix atoms. Light atoms, however, are more likely to elastically recoil and scatter at a large angle (e.g., back towards the absorber particle(s)), with little energy loss relative to heavier atoms. In particular, basic calculations illustrate that when a D nucleus is $10^7$ K, thermal velocity is $\sim 2 \times 10^7$ cm/s, and for time, $t=2 \times 10^{-8}$ s, the outer D atoms of the absorber particle are expected to diffuse a RMS distance ($D_{RMS}$), as follows:

$$D_{RMS} = \sqrt{l_0 vt} \sim 1 \times 10^{-4} \text{ cm}$$

This distance ($D_{RMS}$), while small, can increase the volume of a spherical absorber particle by an unacceptably large factor of ~64. Moreover, the outward flow of atoms is also stemmed by the aforementioned, synchronized incoming pressure wave. In this regard, the pressure wave provides the matrix atoms with an inward velocity relative to the absorber particle, and also reduces interstitial spaces in the condensed matter matrix, thereby, blocking ballistic and diffusive transport. Fortunately, however, light elements also experience greater scattering angles relative to heavier elements, which, thereby, increases the absorber particle light element concentration (e.g., the as-prepared composition of the above-discussed absorber particles is ~30 to 40 atomic % D).

According to previous studies, nuclear fusion "breakeven" is not achievable by the ignition of one of a small number of atoms. This is because there is simply too much energy inefficiency at every stage. In this regard, the primary energy for particle heating is the energy stored in the superconductive inductors and capacitors used in the primary circuit. Thereafter, the cascade of events that convert stored energy to a heated particle is compromised by abundant inefficiency. For example, as the superconducting filament is warmed to the resistive state, a significant amount of power will be deposited into the filament. Thereafter, the current in the energy storage device (e.g., the aforementioned superconducting inductor) will eventually exceed its critical value and, thus, it will revert to a conventional resistive device. Unfortunately, conventional resistive devices' energy loss due to heating within the inductor (or other energy storage device) used in the circuit(s) is evident.

By contrast, radiant particle heating can be extremely efficient, with the exception of energy loss through aforementioned blackbody radiation emitted from the heated particle. Thus, according to one embodiment, waste heat and radiation can be efficiently converted into both increasing pressure build and standing-pressure wave generation. However, pressure wave heating of the absorber particles is limited by $2^{nd}$ law considerations (i.e., the amount of work done during absorber particle compression). Therefore, in accordance with one embodiment of the present invention, the vessel of the flashtube needs to be built strong enough to withstand and to contain a first absorber particle fusion ignition to build pressure and resonant pressure standing waves, with lifetimes in excess of $10^{-7}$ s, to thus, bring subsequent absorber particles to ignition temperature(s).

According to one embodiment, the building of pressure waves can be greatly augmented through the use of pressure pulse resonance tuning, where a standing wave within the vessel cavity, a cavity within the matrix, and/or any other space within the vessel volume, is generated. In this regard, standing waves provide a pressure pulse and relaxation with vapor within the cavity that adiabatically heats during pressure cycles, and cools during relaxation.

According to one embodiment, volumes suitable for standing wave formation can be estimated by calculation and/or by trial and error. For example, first order calculations can be generated, in which it is assumed that a cavity within the absorber particle/light-scattering layer has been sufficiently preheated, so as to melt or to be near melting temperature, where the structure is not stiff or liquid-like.

According to one embodiment, the vessel of the flashtube may be comprised of machinable ceramic that is, preferably, sufficiently thick walled to resist damage from initial heating and fusion events. The walls of the vessel may also be reinforced with metal or other materials that retain strength at a low temperature. In this regard, if conductive reinforcing materials are used, these materials must be insulated or shielded from the filament current/voltage.

According to yet another embodiment, magnetic fields can be applied to the flashtube vessel to help contain fast-moving charged species. In this regard, containment of fast-moving particles, which allows for collision with other materials within the vessel, helps to heat the absorber particles and inhibits heat loss and vessel wall damage.

In general, any method that generates heat usually requires a heat harvesting method. According to one embodiment of the present invention, since the flashtube device is small and can be made sufficiently waterproof, the entire flashtube structure can be immersed in a water bath. Note, however, that since the flashtube structure is necessarily cold (e.g., to support a superconducting filament), there is a need for a liquid helium curtain or an outer containment structure that will insulate and limit heating of the liquid helium, until the filament is triggered and the internal reactions are completed (e.g., for a very short time, $<10^{-7}$ s). In this regard, the heat that is generated by the flashtube, along with its driver circuits, as well as radiant energy and generated energies, all contribute to bath heating. This resultant heat pool can thus, be used in place of traditional pools heated by fossil fuel combustion. Accordingly, uses of this resultant heat pool include, for example, the generation of steam to drive turbines for electrical generation and/or propulsion, etc.

According to another embodiment, the superheated internal components and/or gases of the flashtube (or lamp) could be used to excite and/or pump atomic and/or molecular species to high energy. In this regard, the stimulated emission (e.g., when a resonator cavity design is applied to the flashtube housing) can include direct radiant energy and/or particle beams.

According to yet another embodiment, the energy released by a flashtube initiated fusion of absorber particles could also be directed to a cascade of increasingly sized "flashtubes," where a first flashtube is triggered by the heating of a superconductive filament, as described above. According to this embodiment, the first flashtube is, itself, designed to vaporize by the thermal and nuclear energy released. Thereafter, the light and shockwave of this vaporization is then used (e.g., in the role of a filament) to provide a light pulse and shockwave to a coating containing absorber particles in a second, larger vessel or flashtube. Accordingly, the multiplexing of two or more ever-larger flashtubes can provide thermo-nuclear bombs, without fission bomb triggers.

According to one embodiment, the extreme heating of absorber particles within a cooler matrix provides that, with, for example, matrix engineering (e.g., controlled collapse of thermal insulation properties through component vaporization), heated particles can be extremely, quickly quenched. Moreover, in addition to heating, fusion, which targets the flashtube, can also be used for the ultra-fast heating and quenching of absorber particles for the preparation of non-equilibrium condensed materials.

Although this invention has been described with respect to certain specific exemplary embodiments, many additional modifications and variations would be apparent to those skilled in the art in light of this disclosure. It is, therefore, to be understood that this invention may be practiced otherwise than as specifically described. Thus, the exemplary embodiments of the invention should be considered in all respects to be illustrative and not restrictive, and the scope of the invention to be determined by any claims supportable by this application, and the equivalents thereof, rather than by the foregoing description.

What is claimed is:

1. A flashtube device comprising:
a housing that consists of a small volume;
a flash lamp surrounded by the housing;
an inner surface of the housing being coated with light-absorbing particles; and
submicron fuel particles dispersed in a transparent light-scattering media contained in the housing, the light-scattering material being configured to guide light to the light-absorbing particles by diffuse light collection, wherein
the flash lamp comprises a thin superconducting element held at low temperature in series with a superconducting inductor, and
the light-absorbing particles comprise fusable nucleotides.

2. The flashtube device according to claim 1, wherein a space is defined between the filament and the housing.

3. The flashtube device according to claim 2, wherein the space extends a distance that is equal to about zero.

4. The flashtube device according to claim 3, wherein an inner wall of the housing is coated with a mixture of said light-scattering particles and said light-absorbing particles.

5. The flashtube device according to claim 4, wherein the fusable nucleotides comprise at least one of deuterium, tritium and lithium.

6. The flashtube device according to claim 5, wherein the light scattering particles comprise at least one of $TiO_2$, diamond particles, frozen $D_2O$, frozen $H_2O$, frozen $CO_2$ and other substantially transparent materials.

7. The flashtube device according to claim 4, wherein flashtube device is initially at a temperature that is below the sublimation temperature of $CO_2$.

8. The flashtube device according to claim 4, wherein the flashtube device builds pressure by discharge heating of working gas that is augmented by the evaporation of the frozen material disposed within the flashtube.

9. The flashtube device according to claim 4, wherein the flashtube device (a) builds absorber particle temperature to $\sim 10^6$ K by (i) direct absorption of flashtube radiant energy and (ii) pressure rise, and (b) maintains absorber particle temperature for greater than $10^{-9}$ s.

10. The flashtube device according to claim 4, comprising X-ray scattering material positioned externally to the housing, wherein
the X-ray scattering material comprises aluminum reflectors, and
the aluminum reflectors return radiation to materials disposed within the housing.

11. A multiplexed, flashtube thermonuclear reactor comprising first and second flashtubes according to claim 4, wherein
filament vaporization triggers the first flashtube, so that destruction of the first flashtube provides heat and pressure to trigger the second flashtube to thereby generate large-scale detonations.

12. The multiplexed, flashtube thermonuclear reactor according to claim 11, wherein the second flashtube is larger than the first flashtube.

13. The multiplexed, flashtube thermonuclear reactor according to claim 12, wherein the second flashtube is concentric with the first flashtube.

14. The flashtube device according to claim 1, wherein the flash lamp is held in a superconducting state.

15. The flashtube device according to claim 14, wherein the flash lamp is connected to a power source that is composed of superconducting elements.

16. The flashtube device according to claim 14, wherein the flashtube device is triggered by locally heating the filament to cause decay of the superconducting state.

17. The flashtube device according to claim 14, wherein a sufficient volume of at least one of (a) the housing and (b) the filament are cooled to a low temperature (i) to induce the superconducting state of said filament and (ii) to reduce a gas vapor pressure of said volume to a low pressure.

18. The flashtube device according to claim 17, wherein the low pressure is less than 10 Torr.

19. The flashtube device according to claim 1, wherein the filament is disposed within a superconducting circuit.

20. The flashtube device according to claim 19, wherein at least one element in the superconducting circuit is an energy storage device.

21. The flashtube device according to claim 20, wherein the energy storage device comprises a superconducting inductor.

22. The flashtube device according to claim 1, which has an initial pressure of less than 10 Torr.

23. A method for directly heating a material for energy extraction, by providing the flashtube device according to claim 1.

24. The method according to claim 23, wherein the material comprises a water bath.

* * * * *

UNITED STATES PATENT AND TRADEMARK OFFICE
CERTIFICATE OF CORRECTION

| | |
|---|---|
| PATENT NO. | : 11,721,540 B2 |
| APPLICATION NO. | : 17/271084 |
| DATED | : August 8, 2023 |
| INVENTOR(S) | : Charles Michael Fortmann |

It is certified that error appears in the above-identified patent and that said Letters Patent is hereby corrected as shown below:

On the Title Page

<u>IN THE ABSTRACT</u>
Lines 1-2, "micro-scale light absorbent" should read --micro-scale light-absorbent--

In the Specification

<u>Column 1</u>
Line 6, "Aug. 27, 2019 which claims" should read --Aug. 27, 2019, which claim--
Line 8, "filed on. Aug. 27," should read --filed on Aug. 27,--
Line 16, "micro-scale light absorbent" should read --micro-scale light-absorbent--
Line 23, "micro-scale light absorbent" should read --micro-scale light-absorbent--
Line 31, "shockwave that is" should read --shockwave, which is--
Line 34, "are thus, further" should read --are thus further--
Lines 40-41, "pulse shaping elements." should read --pulse-shaping elements.--
Line 53, "a low temperature" should read --a low-temperature--
Line 65, "light scattering particles are" should read --light-scattering particles that are--

<u>Column 2</u>
Line 5, "Deuterium, Tritium, and Lithium." should read --deuterium, tritium, and lithium.--
Lines 7-8, "light scattering particles." should read --light-scattering particles.--
Line 8, "The light scattering particles" should read --The light-scattering particles--
Line 12, "less than 10 Torr." should read --less than 10 torr.--
Line 18, "a Torr to several Torr." should read --a torr to several torr.--
Line 21, "fraction of a Torr" should read --fraction of a torr--
Line 22, "to several Torr." should read --to several torr.--
Line 48, "atomic or molecule system" should read --atomic or molecular system--
Line 56, "to, thereby, generate" should read --to thereby generate--

Signed and Sealed this
Twenty-fourth Day of October, 2023

Katherine Kelly Vidal
*Director of the United States Patent and Trademark Office*

CERTIFICATE OF CORRECTION (continued)
U.S. Pat. No. 11,721,540 B2

Column 3
Line 8, "light scattering diamond" should read --light-scattering diamond--
Line 22, "light absorbent particles" should read --light-absorbent particles--
Lines 26-27, "light absorbent particles" should read --light-absorbent particles--
Line 29, "may be comprised of a" should read --may comprise a--
Line 35, "(1) comprised of" should read --(1) comprising--
Line 46, "a light scattering layer" should read --a light-scattering layer--
Line 66, "may be comprised of, for" should read --may comprise, for--

Column 4
Lines 3-4, "the light scattering layer" should read --the light-scattering layer--
Line 5, "can be comprised of several" should read --can comprise several--
Line 9, "may be comprised of an" should read --may comprise an--
Line 10, "an IR scattering particle" should read --an IR-scattering particle--
Lines 11-12, "light scattering particles" should read --light-scattering particles--
Lines 20-21, "may be comprised of (but" should read --may comprise (but--
Line 28, "and, in-turn, the" should read --and, in turn, the--
Line 29, "(e.g. the superconducting" should read --(e.g., the superconducting--
Line 32, "filament (e.g. the" should read --filament (e.g., the--
Line 36, "in the light scattering layer" should read --in the light-scattering layer--
Line 38, "small enough, such that" should read --small enough that--
Line 40, "temperature, would" should read --temperature would--
Line 42, "to, 10,000 Torr)" should read --to, 10,000 torr)--
Line 49, "various light scattering" should read --various light-scattering--
Lines 50-51, "pressure raising constituents" should read --pressure-raising constituents--
Line 67, "The energy storing circuit" should read --The energy-storing circuit--

Column 5
Line 21, "spectrum, towards the" should read --spectrum, toward the--
Line 25, "is fully-described by" should read --is fully described by--
Line 38, "light absorbent molecules," should read --light-absorbent molecules,--
Line 42, "may be comprised of" should read --may comprise--
Line 43, "oxides" should read --oxide--
Lines 66-67, "IR, near IR, and" should read --IR, near-IR, and--

Column 6
Lines 4-5, "the IR scattering coating" should read --the IR-scattering coating--
Lines 19-20, "mechanism) is reduced." should read --mechanism) are reduced.--
Lines 33-34, "a wavelength dependent" should read --a wavelength-dependent--
Line 39, "molecular $CO_2$ in which" should read --molecular $CO_2$, in which--
Line 43, "thereby, slowing radiant" should read --thereby slowing radiant--
Line 53, "Lawson Criteria is to" should read --Lawson Criteria are to--
Line 54, "In-turn, the" should read --In turn, the--
Line 56, "of $10^6$ Watts." should read --of $10^6$ watts.--
Line 61, "filament provides for" should read --filament provide for--

CERTIFICATE OF CORRECTION (continued)
U.S. Pat. No. 11,721,540 B2

Column 7
Line 23, "levels. In-turn, the" should read --levels. In turn, the--
Lines 45-46, "a vaporization induced shockwave that is comprised of the" should read --a vaporization-induced shockwave that comprises the--
Line 52, "a light scattering coating" should read --a light-scattering coating--
Line 56, "a non-light absorbing," should read --a non-light-absorbing,--
Line 57, "the light absorbing matrix" should read --the light-absorbing matrix--
Line 60, "the light absorbing particles" should read --the light-absorbing particles--
Lines 62-63, "the light absorbing material" should read --the light-absorbing material--

Column 8
Line 5, "to thus, enhance" should read --to thus enhance--
Line 7, "extent, Van der Waals" should read --extent, van der Waals--
Line 18, "by the particle, both" should read --by the particle both--
Line 20, "the light absorbing particles" should read --the light-absorbing particles--
Line 22, "will, thereby, absorb" should read --will thereby absorb--
Line 41, "volumes, Van der Waals" should read --volumes, van der Waals--
Line 61, "scattering type particles" should read --scattering-type particles--

Column 9
Lines 6-7, "use UV scattering, non-UV absorber matrix" should read --use UV- scattering, non-UV-absorber matrix--
Lines 9-10, "the light scattering matrix." should read --the light-scattering matrix.--
Line 17, "itself be comprised of a" should read --itself comprise a--
Line 19, "than $10^9$ Watts." should read --than $10^9$ watts.--
Line 24, "may be comprised of a" should read --may comprise a--
Line 41, "now, non-superconducting" should read --now non-superconducting--

Column 10
Line 12, "sufficient to radiant" should read --sufficient to radiate--
Lines 13-14, "materials near to or on" should read --materials near or on--
Line 36, "for example, Titanium" should read --for example, titanium--
Line 46, "thereby, generating" should read --thereby generating--
Line 47, "for high speed vapor" should read --for high-speed vapor--
Line 52, "needs be sufficiently" should read --needs to be sufficiently--
Lines 55-56, "radiation, preheating absorber particles enables" should read --radiation and preheating absorber particles enable--
Lines 57-60, "timing. Since" should read --timing, since--
Line 61, "intense high energy (i.e.," should read --intense high-energy (i.e.,--
Line 62, "filament, requires" should read --filament requires--

Column 11
Line 7, "so-called Greenhouse effect" should read --so-called Greenhouse Effect--
Lines 10-11, "moves at a much slower speed, thereby, aiding" should read --move at a much slower speed, thereby aiding--
Line 13, "slowing heating, aids in" should read --slowing heating aid in--

CERTIFICATE OF CORRECTION (continued)
U.S. Pat. No. 11,721,540 B2

Line 15, "enables larger" should read --enable larger--
Line 21, "levels, later release" should read --levels later release--
Line 37, "matric" should read --matrix--
Line 41, "and thereby, absorb" should read --and thereby absorb--
Line 48, "deuteriated" should read --deuterated--
Line 50, "at St. John's and" should read --at St. John's University and--
Lines 51-52, "light absorbing matrix" should read --light-absorbing matrix--
Line 63, "favorable x-ray emission" should read --favorable X-ray emission--
Line 65, "heavy water) is compared." should read --heavy water) are compared.--

Column 12
Line 2, "chlorophyll-based is absorption is strong" should read --chlorophyll-based absorption is strong--
Line 7, "1,000,000 K" should read --1,000,000K--
Line 19, "can leads to" should read --can lead to--
Line 21, "(e.g., comprised of $TiO_2$" should read --(e.g., comprising $TiO_2$--
Lines 37-38, delete "and/or since"
Line 44, In equation 6: "$L_{rms}$" should read --$l_{rms}$--
Line 51, "a light scattering diamond" should read --a light-scattering diamond--
Line 67, "In-turn," should read --In turn,--

Figure 5:
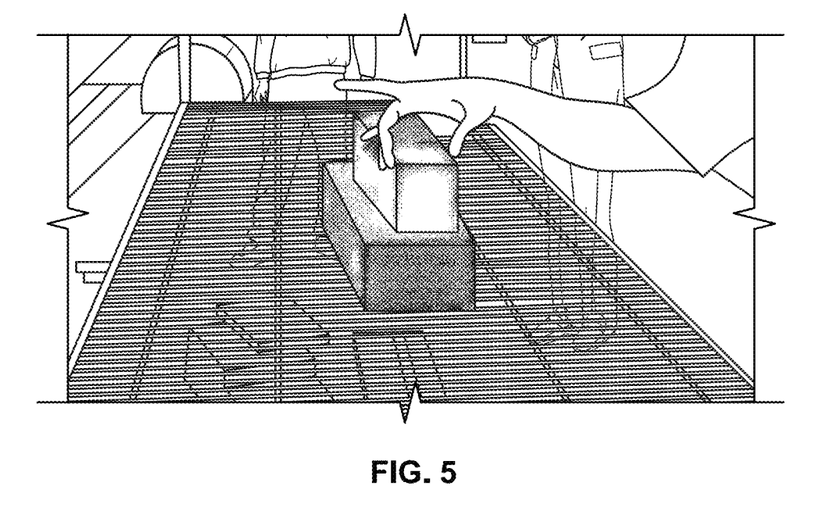
FIG. 5 is a general photo of a NASA Space Shuttle insulating tile demonstrating sufficiently small thermal conductivity and thermal mass.

Column 13
Line 1, "time, thereby, increasing" should read --time, thereby increasing--
Lines 2-3, "Secondly, by" should read --Second, by--
Lines 9-10, "which in-turn, delivers" should read --which in turn delivers--
Line 10, "absorber particle through" should read --absorber particles through--
Lines 15-16, "light scattering particles" should read --light-scattering particles--
Line 20, "(e.g., achieved, for example," should read --(achieved, for example,--
Line 20, "$\leq 5 \times 10^{-7}$ s)" should read --$\leq 5 \times 10^{-7}$ s)--
Line 27, "to cost effectively prepare these materials both in" should read --to cost-effectively prepare both of these materials in--
Line 28, "deuteriated form." should read --deuterated form.--
Lines 29-30, "preferably, in a deuteriated form," should read --preferably in a deuterated form,--
Line 42, "embodiment, Figure S," should read --embodiment, FIG. 5,--
Line 45, "mass allows for" should read --mass allow for--
Line 45, "for a 2200° F. specimen" should read --for a 2200° F specimen--
Line 48, "include small grained" should read --include small-grained--
Line 52, "Diamond particles" should read --diamond particles--
Line 58, "a solid comprised of" should read --a solid composed of--
Lines 59-60, "phonon-based heat-transport." should read --phonon-based heat transport.--
Line 65, "and Diamond" should read --and diamond--

Column 14
Lines 7-8, "strong, light scattering" should read --strong, light-scattering--
Line 21, "e.g., Van der Waals" should read --e.g., van der Waals--
Lines 40-41, "achieves Lawson criteria and, thereby, vaporizes" should read --achieves Lawson

CERTIFICATE OF CORRECTION (continued)
U.S. Pat. No. 11,721,540 B2

Criteria and thereby vaporizes--
Lines 44-45, "adds, in-phase, to the" should read --adds, in phase, to the--
Line 48, "which, thus, leads to" should read --which thus leads to--
Line 62, "components, achieves" should read --components achieves--

Column 15
Lines 6-7, "Lawson criteria relates to clear, confinement" should read --Lawson Criteria relate to clear confinement--
Line 12, "~2×10⁷ cm/s." should read --~2 × 10⁷ cm/s.--
Line 18, "towards the" should read --toward the--
Line 21, " ~2×10⁷ cm/s, and for time, t=2×10⁻⁸ s," should read "~2 × 10⁷ cm/s, and for time, t = 2 × 10⁻⁸ s,"
Line 22, "to diffuse a RMS" should read --to diffuse an RMS--
Line 29, "aforementioned, synchronized" should read --aforementioned synchronized--
Line 33, "matrix, thereby, blocking" should read --matrix, thereby blocking--
Lines 35-36, "elements, which, thereby, increases" should read --elements, which thereby increases--
Lines 57-58, "through aforementioned" should read --through the aforementioned--
Line 63, "by 2$^{nd}$ law" should read --by 2$^{nd}$ law--

Column 16
Line 2, "to thus, bring" should read --to thus bring--
Line 15, "first order calculations" should read --first-order calculations--
Line 20, "may be comprised of" should read --may be composed of--
Line 21, "sufficiently thick walled" should read --sufficiently thick-walled--
Line 47, "can thus, be used" should read --can thus be used--
Line 60, "flashtube initiated fusion" should read --flashtube-initiated fusion--
Lines 64-65, "is, itself, designed" should read --is itself designed--
Lines 66-67, "vaporization is then" should read --vaporization are then--

Column 17
Line 4, "thermo-nuclear bombs" should read --thermonuclear bombs--
Line 10, "can be extremely, quickly quenched." should read --can be quenched extremely quickly.--

In the Claims

Column 17
Line 50, "light scattering particles" should read --light-scattering particles--